(12) United States Patent
Jakkam Reddi et al.

(10) Patent No.: US 12,229,675 B2
(45) Date of Patent: Feb. 18, 2025

(54) ADAPTIVE OPTIMIZATION WITH IMPROVED CONVERGENCE

(71) Applicant: Google LLC, Mountain View, CA (US)

(72) Inventors: Sashank Jakkam Reddi, Jersey City, NJ (US); Sanjiv Kumar, Jericho, NY (US); Satyen Chandrakant Kale, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/081,403

(22) Filed: Dec. 14, 2022

(65) Prior Publication Data

US 2023/0113984 A1     Apr. 13, 2023

Related U.S. Application Data

(63) Continuation of application No. 16/130,058, filed on Sep. 13, 2018, now Pat. No. 11,586,904.

(51) Int. Cl.
| | |
|---|---|
| G06N 3/08 | (2023.01) |
| G06F 17/16 | (2006.01) |
| G06N 3/045 | (2023.01) |
| G06N 20/00 | (2019.01) |

(52) U.S. Cl.
CPC ............... *G06N 3/08* (2013.01); *G06F 17/16* (2013.01); *G06N 3/045* (2023.01); *G06N 20/00* (2019.01)

(58) Field of Classification Search
CPC ....................................................... G06N 3/08
See application file for complete search history.

(56) References Cited

U.S. PATENT DOCUMENTS 11,586,904 B2 * 2/2023 Jakkam Reddi ....... G06N 3/045

OTHER PUBLICATIONS

Huang, H., Wang, C., & Dong, B. (2018). Nostalgic Adam: Weighting more of the past gradients when designing the adaptive learning rate. Arxiv.org (Year: 2018) (Year: 2018).*
Diederik P. Kingma, & Jimmy Ba. (2017). Adam: A Method for Stochastic Optimization. (Year: 2017).*
Auer et al., "Adaptive and Self-Confident On-Line Learning Algorithms", Journal of Computer and System Sciences, vol. 64, Issue 1, Feb. 28, 2002, pp. 48-75.
Cesa-Bianchi et al., "On the Generalization Ability of On-Line Learning Algorithms", Institute of Electrical and Electronics Engineers Transactions on Information Theory, vol. 50, No. 9, Sep. 2004, pp. 2050-2057.

(Continued)

*Primary Examiner* — Kakali Chaki
*Assistant Examiner* — Johnathan R Germick
(74) *Attorney, Agent, or Firm* — DORITY & MANNING P.A.

(57) ABSTRACT

Generally, the present disclosure is directed to systems and methods that perform adaptive optimization with improved convergence properties. The adaptive optimization techniques described herein are useful in various optimization scenarios, including, for example, training a machine-learned model such as, for example, a neural network. In particular, according to one aspect of the present disclosure, a system implementing the adaptive optimization technique can, over a plurality of iterations, employ an adaptive learning rate while also ensuring that the learning rate is non-increasing.

20 Claims, 8 Drawing Sheets

(56) References Cited

OTHER PUBLICATIONS

Chen et al., "Closing the Generalization Gap of Adaptive Gradient Methods in Training Deep Neural Networks", arXiv:1806.06763v3, Jun. 23, 2020, 17 pages.

Dozat, "Incorporating Nesterov Momentum into Adam", 4th International Conference on Learning Representations, Workshop Track, May 2-4, 2016, San Juan, Puerto Rico, 4 pages.

Duchi et al., "Adaptive Subgradient Methods for Online Learning and Stochastic Optimization", Journal of Machine Learning Research, vol. 12, Feb. 2011, pp. 2121-2159.

Huang et al., "Nostalgic Adam: Weighting More of the Past Gradients When Designing the Adaptive Learning Rate", arXiv:1805.07557v2, Feb. 23, 2019, 17 pages.

Kingma et al., "Adam: A Method for Stochastic Optimization", 3rd International Conference on Learning Representations, May 7-9, 2015, San Diego, California, United States, arXiv:1412.6980v9, 15 pages.

Krizhevsky et al., "ImageNet Classification with Deep Convolutional Neural Networks", Advances in Neural Information Processing Systems Dec. 3-8, 2012, Lake Tahoe, Nevada, United States, pp. 1097-1105.

McMahan et al., "Adaptive Bound Optimization for Online Convex Optimization", 23rd Annual Conference on Learning Theory, Jun. 27-29, 2010, Haifa, Israel, pp. 244-256.

Srivastava et al., "Dropout: A Simple Way to Prevent Neural Networks from Overfitting", Journal of Machine Learning Research, vol. 15, Jan. 2014, pp. 1929-1958.

Tieleman et al., "RmsProp: Divide the Gradient by a Running Average of its Recent Magnitude", COURSERA: Neural Networks for Machine Learning, vol. 4, Issue 2, Oct. 2012, pp. 26-31.

Zeiler, "ADADELTA: An Adaptive Learning Rate Method", arXiv: 1212.5701v1, Dec. 22, 2012, 6 pages.

Zinkevich, "Online Convex Programming and Generalized Infinitesimal Gradient Ascent", 20th International Conference on Machine Learning, Aug. 21-24, 2003, Washington, DC, United States, pp. 928-936.

* cited by examiner

ADAPTIVE OPTIMIZATION WITH IMPROVED CONVERGENCE

PRIORITY CLAIM

The present application is a continuation of U.S. application Ser. No. 16/130,058 having a filing date of Sep. 13, 2018. Applicant claims priority to and the benefit of each of such applications and incorporate all such applications herein by reference in its entirety.

FIELD

The present disclosure relates generally to systems and methods to solve optimization problems, such as training a machine-learned model. More particularly, the present disclosure relates to adaptive optimization techniques with improved convergence properties.

BACKGROUND

Machine-learned models such as artificial neural networks typically include a number of parameters. In various machine learning techniques, the final values of the parameters are learned through an iterative training process which updates the parameters at each of a plurality of training iterations. For example, at each iteration, the performance of the model relative to a set (e.g., a "minibatch") of training data is evaluated using a loss function. The parameters can be updated based on the performance of model as evaluated by the loss function.

The degree or amount by which the parameters of the model are updated at each iteration can be controlled by or otherwise performed in accordance with a learning rate. For example, a relatively smaller learning rate will typically result in relatively smaller changes to the values of the parameters, while a relatively larger learning rate will typically result in relatively larger changes to the values of the parameters at that iteration.

Stochastic gradient descent (Sgd) is one of the dominant methods used today to train deep neural networks. This method iteratively updates the parameters of a model by moving them in the direction of the negative gradient of the loss evaluated on a minibatch of training data.

Variants of Sgd that scale coordinates of the gradient by square roots of some form of averaging of the squared coordinates in the past gradients have been particularly successful, because they automatically adjust the learning rate on a per-feature basis. The first popular algorithm in this line of research is Adagrad [3], [6], which can achieve significantly better performance compared to vanilla Sgd when the gradients are sparse, or in general small.

Although Adagrad works well for sparse settings, its performance has been observed to deteriorate in settings where the loss functions are nonconvex and gradients are dense due to rapid decay of the learning rate in these settings since it uses a sum of the squares of all the past gradients in the update. This problem is especially exacerbated in high dimensional problems arising in deep learning.

To tackle this issue, several variants of Adagrad, such as RMSprop [8], Adam [4], Adadelta [9], Nadam [2], etc., have been proposed which mitigate the rapid decay of the learning rate through use of the exponential moving averages of squared past gradients, essentially limiting the reliance of the update to only the past few gradients. While these algorithms have been successfully employed in several practical applications, they have also been observed to not converge in some other settings. It has been typically observed that in these settings some minibatches provide large gradients but only quite rarely, and while these large gradients are quite informative, their influence dies out rather quickly due to the exponential averaging, thus leading to poor convergence.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for optimizing machine-learned models that provides improved convergence properties. The method includes determining, by one or more computing devices, a gradient of a loss function that evaluates a performance of a machine-learned model that includes a plurality of parameters. The method includes determining, by the one or more computing devices, a candidate learning rate control value based at least in part on the gradient of the loss function. The method includes comparing, by the one or more computing devices, the candidate learning rate control value to a maximum previously observed learning rate control value. The method includes, when the candidate learning rate control value is greater than the maximum previously observed learning rate control value: setting a current learning rate control value equal to the candidate learning rate control value; and setting the maximum previously observed learning rate control value equal to the candidate learning rate control value. The method includes, when the candidate learning rate control value is less than the maximum previously observed learning rate control value: setting the current learning rate control value equal to the maximum previously observed learning rate control value. The method includes determining, by the one or more computing devices, a current learning rate based at least in part on the current learning rate control value. The method includes determining, by the one or more computing devices, an updated set of values for the plurality of parameters of the machine-learned model based at least in part on the gradient of the loss function and according to the current learning rate.

Another example aspect of the present disclosure is directed to a computing system. The computing system includes one or more processors and one or more non-transitory computer-readable media that store instructions that, when executed by the one or more processors, cause the one or more processors to perform operations. The operations include determining a gradient of a loss function that evaluates a performance of a machine-learned model that includes a plurality of parameters. The operations include determining a candidate learning rate based at least in part on the gradient of the loss function. The operations include selecting a minimum of the candidate learning rate and a minimum previously observed learning rate to serve as a current learning rate. The operations include updating at least one of the plurality of parameters of the machine-learned model based at least in part on the gradient of the loss function and according to the current learning rate.

Another example aspect of the present disclosure is directed to one or more non-transitory computer-readable media that store instructions that, when executed by one or more processors, cause the one or more processors to perform operations. The operations include, for each of a plurality of iterations: determining a gradient of a loss function that evaluates a performance of a machine-learned model that comprises a plurality of parameters; determining a candidate learning rate control value based at least in part on the gradient of the loss function; selecting a maximum of the candidate learning rate control value and a maximum previously observed learning rate control value as a current learning rate control value; and updating at least one of the plurality of parameters of the machine-learned model based at least in part on the gradient of the loss function and according to a current learning rate that is a function of the current learning rate control value.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
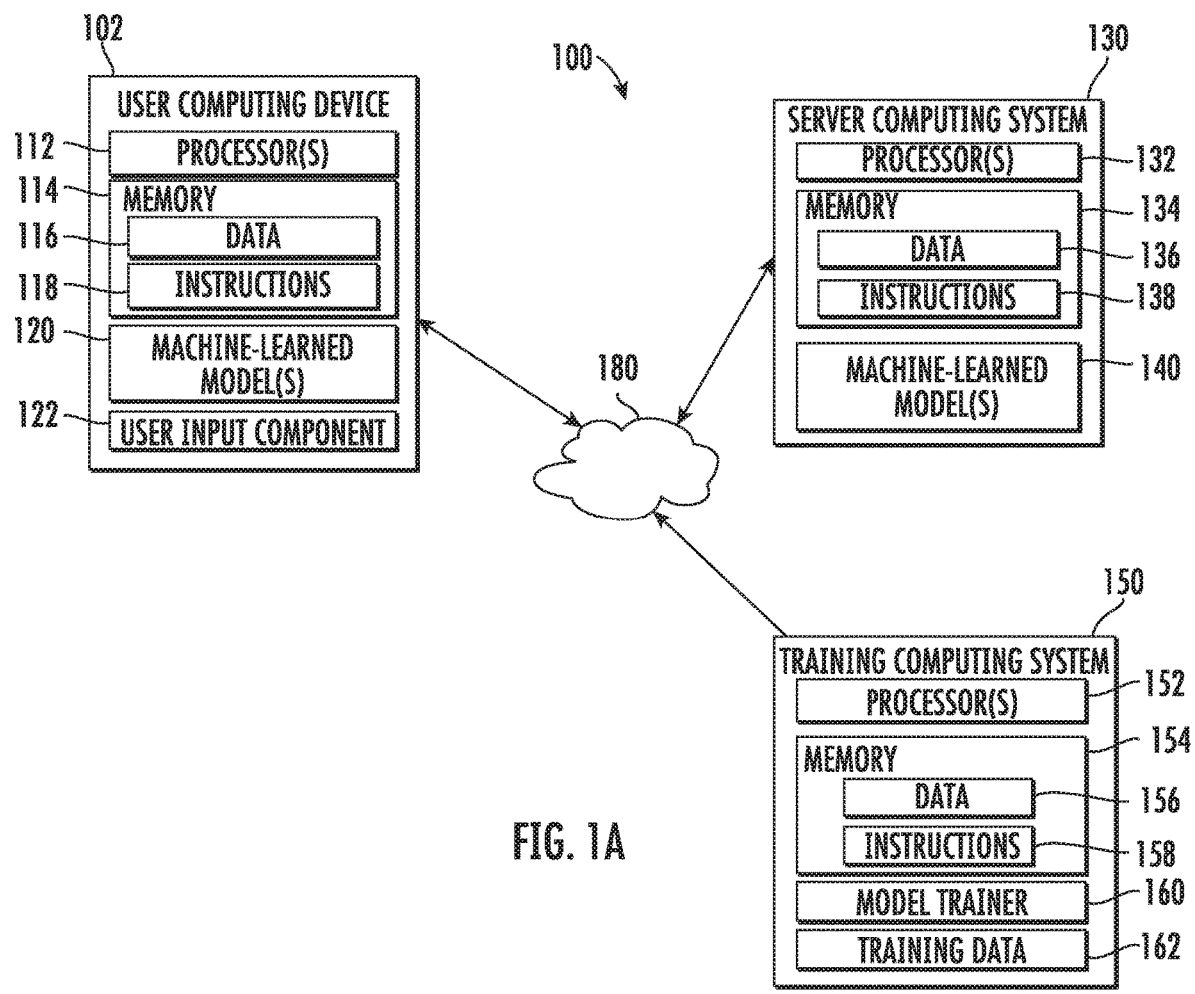
FIG. 1A depicts a block diagram of an example computing system according to example embodiments of the present disclosure.

Reference numerals that are repeated across plural figures are intended to identify the same features or components in various implementations.

DETAILED DESCRIPTION

1. Overview

Generally, the present disclosure is directed to systems and methods that perform adaptive optimization with improved convergence properties. The adaptive optimization techniques described herein are useful in various optimization scenarios, including, for example, training a machine-learned model such as, for example, a neural network. In particular, according to one aspect of the present disclosure, a system implementing the adaptive optimization techniques described herein can, over a plurality of iterations, employ an adaptive learning rate while also ensuring that the learning rate is non-increasing. As one example, some of the adaptive optimization techniques proposed by the present disclosure can control, at each of a plurality of iterations, the learning rate used at that iteration based on a learning rate control value. For example, the learning rate control value can be an exponential moving average of squared past and current gradients of a loss function that evaluates performance of the machine-learned model on training data. The learning rate can be a function of and inversely correlated to the learning rate control value. To avoid situations where the learning rate increases iteration-over-iteration, the system can select, for use in determining the current learning rate for the current iteration, a maximum of a candidate learning rate control value determined for the current iteration and a maximum previously observed learning rate control value seen in past iterations. By selecting the maximum of the candidate learning rate control value and the maximum previously observed control value, the system can ensure that the current learning rate (which may be inversely correlated to the selected control value) does not increase during the iterative optimization. In such fashion, the optimization system can be endowed with "long-term memory" of past gradients. As a result, the optimization techniques described herein can provide the benefits of use of an adaptive learning rate, while avoiding certain scenarios in which existing adaptive optimization techniques fail to converge (e.g., scenarios which result in learning rates that are not monotonically non-increasing). The systems and methods of the present disclosure provide guaranteed convergence, while also reducing the number of hyperparameters, converging faster than certain existing techniques, and providing superior generalization capacity.

More particularly, as indicated above, although the Adagrad technique works well for sparse settings, its performance has been observed to deteriorate in settings where the loss functions are nonconvex and gradients are dense due to rapid decay of the learning rate in these settings since it uses all the past gradients in the update. Several recently proposed stochastic optimization methods that have been successfully used in training deep networks such as RMSprop, Adam, Adadelta, Nadam are based on using gradient updates scaled by square roots of exponential moving averages of squared past gradients. However, in many applications, such as learning with large output spaces, it has been empirically observed that these algorithms fail to converge to an optimal solution (or a critical point in nonconvex settings).

As demonstrated herein, one cause for such failures is the exponential moving average used in the algorithms. In particular, limiting the reliance of the update on essentially only the past few gradients can cause significant convergence issues. In sections below, the present disclosure provides an explicit example of a simple convex optimization setting where the RMSprop and Adam algorithms do not converge to the optimal solution and describes the precise problems with the previous analysis of the Adam algorithm. However, in general, any algorithm that relies on an essentially fixed sized window of past gradients to scale the gradient updates will suffer from the described problem. Thus, the provided analysis also extends to other algorithms that employ averaging squared gradients over essentially a fixed size window in the immediate past (for exponential moving averages, the influences of gradients beyond a fixed window size becomes negligibly small).

According to an aspect of the present disclosure, the systems and methods provided herein fix these convergence issues by endowing such algorithms with "long-term memory" of past gradients. To that end, the present disclosure proposes new optimization techniques which not only fix the convergence issues but often also lead to improved empirical performance while still operating in the almost same time and space requirements of the original Adam algorithm. A convergence analysis is provided for the new variants in the convex setting and a data-dependent regret bound is shown similar to the one in Adagrad.

In particular, according to one aspect, a computing system implementing the example adaptive optimization techniques described herein can control, at each of a plurality of iterations, the learning rate used at that iteration based on a learning rate control value. As one example, the learning rate control value can be an exponential moving average of squared past and current gradients of a loss function that evaluates performance of the machine-learned model on training data. For example, the learning rate control value can be an exponential moving average of the second order moment. In some implementations, the learning rate can be a function of and inversely correlated to the learning rate control value. For example, the learning rate can equal a current step size divided by a square root of a matrix version of the learning rate control value. In some implementations, the step size can be decaying or can be constant.

To avoid situations where the learning rate increases iteration-over-iteration, the computing system can select, for use in determining the current learning rate for the current iteration, a maximum of a candidate learning rate control value determined for the current iteration and a maximum previously observed learning rate control value seen in past iterations. By selecting the maximum of the candidate learning rate control value and the maximum previously observed control value, the system can ensure that the current learning rate (which may be inversely correlated to the selected control value) does not increase during the iterative optimization. In such fashion, the optimization system can be endowed with "long-term memory" of past gradients and can provide improved convergence properties.

The computing system can determine an updated set of values for the plurality of parameters of the machine-learned model based at least in part on the gradient of the loss function and according to the current learning rate. As an example, in some implementations, to determine the updated set of values, the computing system can update a current momentum value based at least in part on the gradient of the loss function and one or more previous momentum values respectively from one or more previous iterations. For example, the current momentum value can be a moving average of the one or more previous momentum values and the gradient of the loss function.

The computing system can determine the updated set of values for the plurality of parameters based at least in part on the current momentum value and according to the current learning rate. As one example, the computing system can perform a projection operation on a current set of values for the plurality of parameters minus the current momentum value times the current learning rate.

Thus, the optimization techniques described herein can provide the benefits of use of an adaptive learning rate, while avoiding certain scenarios in which existing adaptive optimization techniques fail to converge (e.g., scenarios which result in learning rates that are not monotonically non-increasing). The systems and methods of the present disclosure provide a number of technical effects and benefits, including, as examples, providing guaranteed convergence, while also reducing the number of hyperparameters, converging faster than certain existing techniques, and providing superior generalization capacity.

Faster and guaranteed convergence, as provided by the techniques described herein, has a number of technical benefits. As examples, faster convergence means that the training operations require less memory usage, less processor usage, and decreased peak processor requirements. Guaranteed convergence provides more certainty and efficiency in scheduling multiple jobs.

Example implementations of aspects of the present disclosure will now be discussed in further detail. The example algorithms and other mathematical expressions provided below are examples of possible ways to implement aspects of the present disclosure. The systems and methods of the present disclosure are not limited to the example implementations described below.

2. Example Preliminaries

Example Notation

The notation $S_d^+$ is used to denote the set of all positive definite d×d matrices. With slight abuse of notation, for a vector $a \in \mathbb{R}^d$ and a positive definite matrix $M \in \mathbb{R}^d \times \mathbb{R}^d$, a/M is used to denote $M^{-1}a$, $\|M_i\|_2$ is used to denote $\ell_2$-norm of $i^{th}$ row of M and $\sqrt{M}$ is used to represent $M^{1/2}$. Furthermore, for any vectors a, $b \in \mathbb{R}^d$, $\sqrt{a}$ is used for element-wise square root, $a^2$ is used for element-wise square, a/b is used to denote element-wise division and max(a, b) is used to denote element-wise maximum. For any vector $\theta_i \in \mathbb{R}^d$, $\theta_{i,j}$ denotes its $j^{th}$ coordinate where $j \in [d]$. The projection operation $\Pi_{\mathcal{F},A}(y)$ for $A \in S_+^d$ is defined as $\mathrm{argmin}_{x \in \mathcal{F}} \|A^{1/2}(x-y)\|$ for $y \in \mathbb{R}^d$. Finally, $\mathcal{F}$ has bounded diameter $D_\infty$ if $\|x-y\|_\infty \leq D_\infty$ for all x, $y \in \mathcal{F}$.

Example Optimization Setup

A flexible framework to analyze iterative optimization methods is the online optimization problem in the full information feedback setting. In this online setup, at each time step t, the optimization algorithm picks a point (e.g., the parameters of the model to be learned) $x_t \in \mathcal{F}$, where $\mathcal{F} \in \mathbb{R}^d$ is the feasible set of points. A loss function $f_t$ (to be interpreted as the loss of the model with the chosen parameters in the next minibatch) is then revealed, and the algorithm incurs loss $f_t(x_t)$. The algorithm's regret at the end of T rounds of this process is given by $$R_T = \sum_{i=1}^{T} f_t(x_t) - \min_{x \in \mathcal{F}} \sum_{i=1}^{T} f_t(x).$$

Throughout the present disclosure, it is assumed that the feasible set $\mathcal{F}$ has bounded diameter and $\|\nabla f_t(x)\|_\infty$ is bounded for all $t \in [T]$ and $x \in \mathcal{F}$.

One example aim to is to devise an algorithm that ensures $R_T = o(T)$, which implies that on average, the model's performance converges to the optimal one. The simplest algorithm for this setting is the standard online gradient descent algorithm [10], which moves the point $x_t$ in the opposite direction of the gradient $g_t = \nabla f_t(x_t)$ while maintaining the feasibility by projecting onto the set $\mathcal{F}$ via the update rule $x_{t+1} = \Pi_{\mathcal{F}}(x_t - \alpha_t g_t)$, where $\Pi_{\mathcal{F}}(y)$ denotes the projection of $y \in \mathbb{R}^d$ onto the set $\mathcal{F}$ i.e., $\Pi_{\mathcal{F}}(y) = \min_{x \in \mathcal{F}} \|x-y\|$, and $\alpha_t$ is typically set to $\alpha/\sqrt{t}$ for some constant $\alpha$. The aforementioned online learning problem is closely related to the stochastic optimization problem: $\min_{x \in \mathcal{F}} \mathbb{E}_z[f(x, z)]$, popularly referred to as empirical risk minimization (ERM), where z is a training example drawn training sample over which a model with parameters x is to be learned, and $f(x, z)$ is the loss of the model with parameters x on the sample z. In particular, an online optimization algorithm with vanishing average regret yields a stochastic optimization algorithm for the ERM problem [1]. Thus, online gradient descent and stochastic gradient descent (Sgd) are used synonymously.

Example Generic Adaptive Methods Setup

A framework of adaptive methods is now provided that gives insights into the differences between different adaptive methods and is useful for understanding the flaws in a few popular adaptive methods. Algorithm 1 provides an example generic adaptive framework that encapsulates many popular adaptive methods. Note the algorithm is still abstract because the "averaging" functions $\phi_t$ and $\psi_t$ have not been specified. Here $\phi_t: \mathcal{F}^t \to \mathbb{R}^d$ and $\psi_t: \mathcal{F}^t \to \mathcal{S}_+^d$. For ease of exposition, $\alpha_t$ is referred to as step size and $\alpha_t V_t^{-1/2}$ as learning rate of the algorithm and furthermore, the example is restricted to diagonal variants of adaptive methods encapsulated by Algorithm 1 (shown below) where $V_t$ is of the form diag($v_t$).

As illustrated by the expression for the learning rate provided above, the learning rate is a function of or otherwise controlled by $v_t$. Thus, $v_t$ can be referred to as a "learning rate control value." Various example formulations for $v_t$ are described elsewhere herein.

First observe that standard stochastic gradient algorithm falls in this framework by using:

$$\phi_t(g_1, \ldots, g_t) = g_t \text{ and } \psi_t(g_1, \ldots, g_t) = \mathbb{I}, \quad \text{(SgD)}$$

and $\alpha_t = \alpha/\sqrt{t}$ for all $t \in [T]$. While the decreasing step size is required for convergence, such an aggressive decay of learning rate typically translates into poor empirical performance.

The key idea of adaptive methods is to choose averaging functions appropriately so as to entail good convergence. For instance, the first adaptive method Adagrad [3], which propelled the research on adaptive methods, uses the following averaging functions:

$$\phi_t(g_1, \ldots, g_t) = g_t \text{ and } \psi_t(g_1, \ldots, g_t) = \frac{\text{diag}\left(\sum_{i=1}^t g_i^2\right)}{t}, \quad \text{(Adagrad)}$$

and step size $\alpha_t = \alpha/\sqrt{t}$ for all $t \in [T]$. In contrast to a learning rate of $\alpha/\sqrt{t}$ in Sgd, such a setting effectively implies a modest learning rate decay of $\alpha/\sqrt{\sum_i g_{i,j}^2}$ for $j \in [d]$. When the gradients are sparse, this can potentially lead to huge gains in terms of convergence (see [3]). These gains have also been observed in practice for even few non-sparse settings.

Algorithm 1: Example Generic Adaptive Method Setup
Input: $x_1 \in \mathcal{F}$, step size $\{\alpha_t > 0\}_{t=1}^T$, sequence of functions $\{\phi_t, \psi_t\}_{t=1}^T$
for t=1 to T do $$g_t = \nabla f_t(x_t)$$

$$m_t = \phi_t(g_1, \ldots, g_t) \text{ and } V_t = \psi_t(g_1, \ldots, g_t)$$

$$\hat{x}_{t+1} = x_t - \frac{\alpha_t m_t}{\sqrt{V_t}}$$

$$x_{t+1} = \prod_{\mathcal{F}, \sqrt{V_t}}(\hat{x}_{t+1})$$

end for

Example Adaptive Methods Based on Exponential Moving Averages

Exponential moving average variants of Adagrad are popular in the deep learning community. RMSprop, Adam, Nadam, and Adadelta are some prominent algorithms that fall in this category. The key difference in adaptive methods of this type is to use an exponential moving average as function $\psi_t$ instead of the simple average function used in Adagrad. Adam, a particularly popular variant, uses the following averaging functions:

$$\phi_t(g_1, \ldots, g_t) = (1-\beta_1)\sum_{i=1}^t \beta_1^{t-i} g_i \text{ and } \psi_t(g_1, \ldots, g_t)$$

$$= (1-\beta_2) \text{ diag}\left(\sum_{i=1}^t \beta_2^{t-i} g_i^2\right), \quad \text{(Adam)}$$

for some decay factors $\beta_1, \beta_2 \in [0,1)$. This update can alternatively be stated by the following simple recursion:

$$m_{t,i} = \beta_1 m_{t-1,i} + (1-\beta_1)g_{t,i} \text{ and } v_{t,i} = \beta_2 v_{t-1,i} + (1-\beta_2)g_{t,i}^2 \quad (1)$$

and $m_{0,i} = 0$ and $v_{0,i} = 0$ for all $i \in [d]$. and $t \in [T]$.

Here, for simplicity, the debiasing step used in the version of Adam used in the original paper by [4] is omitted. However, the discussion applies to the debiased version as well.

A value of $\beta_1 = 0.9$ and $\beta_2 = 0.999$ is typically recommended in practice. Note the additional projection operation in Algorithm 1 in comparison to Adam. When $\mathcal{F} = \mathbb{R}^d$, the projection operation is an identity operation and this corresponds to the algorithm in [4] or theoretical analysis, one requires $\alpha_t = 1/\sqrt{t}$ for $t \in [T]$, although, a more aggressive choice of constant step size seems to work well in practice. RMSprop, which appeared in an earlier unpublished work [8] is essentially a variant of Adam with $\beta_1 = 0$. In practice, especially in deep learning applications, the momentum term arising due to non-zero $\beta_1$ appears to significantly boost the performance. The discussion in the following section will mainly focus on Adam algorithm due to this generality but the arguments also apply to RMSprop and other algorithms such as Adadelta, Nadam.

3. Example Discussion on the Non-Convergence of Adam

With the problem setup in the previous section, this section discusses a fundamental flaw in the current exponential moving average methods like Adam. It is shown that Adam (and others by analogy) can fail to converge to an optimal solution even in simple one-dimensional convex settings. These examples of non-convergence contradict the claim of convergence in [4], and the main issue lies in the following quantity of interest:

$$\Gamma_{t+1} = \left(\frac{\sqrt{V_{t+1}}}{\alpha_{t+1}} - \frac{\sqrt{V_t}}{\alpha_t}\right). \quad (2)$$

This quantity essentially measures the change in the inverse of learning rate of the adaptive method with respect to time. One key observation is that for Sgd and Adagrad, $\Gamma_t \geq 0$ for all $t \in [T]$. This simply follows from update rules of Sgd and Adagrad in the previous section. In particular, update rules for these algorithms lead to "non-increasing" learning rates. However, this is not necessarily the case for exponential moving average variants like Adam and RMSprop i.e., $\Gamma_t$ can potentially be indefinite for $\in [T]$. It is shown herein that this violation of positive definiteness can lead to undesirable convergence behavior for Adam and RMSprop. Consider the following simple sequence of linear functions for $\mathcal{F}=[-1,1]$:

$$f_t(x) = \begin{cases} Cx, & \text{for } t \bmod 3 = 1 \\ -x, & \text{otherwise,} \end{cases}$$

where C>2. For this function sequence, it is easy to see that the point x=−1 provides the minimum regret. Suppose $\beta_1=0$ and $\beta_2=1/(1+C^2)$. It is shown herein that Adam converges to a highly suboptimal solution of x=+1 for this setting. Intuitively, the reasoning is as follows. The algorithm obtains the large gradient C once every 3 steps, and while the other 2 steps it observes the gradient −1, which moves the algorithm in the wrong direction. The large gradient C is unable to counteract this effect since it is scaled down by a factor of almost C for the given value of $\beta_2$, and hence the algorithm converges to 1 rather than −1. This intuition is formalized in the result below.

Theorem 1 There is an online convex optimization problem where Adam has non-zero average regret i.e., $R_T/T \to 0$ as $T \to \infty$.

One might wonder if adding a small constant in the denominator of the update helps in circumventing this problem i.e., the update for Adam in Algorithm 1 of $\hat{x}_{t+1}$ is modified as follows:

$$\hat{x}_{t+1} = x_t - \frac{\alpha_t m_t}{\sqrt{V_t + \varepsilon \mathbb{1}}}. \quad (3)$$

The algorithm in [4] uses such an update in practice, although their analysis does not. In practice, selection of the ε parameter appears to be critical for the performance of the algorithm. However, for any constant ε>0, there exists an online optimization setting where, again, Adam has non-zero average regret asymptotically.

The above examples of non-convergence are catastrophic insofar that Adam and RMSprop converge to a point that is worst amongst all points in the set [−1,1]. Note that the above example also holds for constant step size $\alpha_t=\alpha$. Also note that classic Sgd and Adagrad do not suffer from this problem and for these algorithms, average regret asymptotically goes to 0. This problem is especially aggravated in high dimensional settings and when the variance of the gradients with respect to time is large. This example also provides intuition for why large $\beta_2$ is advisable while using Adam algorithm, and indeed in practice using large $\beta_2$ helps. However the following result shows that for any constant $\beta_1$ and $\beta_2$ with $\beta_1<\sqrt{\beta_2}$, there is an example where Adam has non-zero average rate asymptotically.

Theorem 2 For any constant $\beta_1, \beta_2 \in [0,1)$ such that $\beta_1<\sqrt{\beta_2}$, there is an online convex optimization problem where Adam has non-zero average regret i.e., $R_T/T \to 0$ as $T \to \infty$.

The above results show that with constant $\beta_1$ and $\beta_2$, momentum or regularization via ε will not help in convergence of the algorithm to the optimal solution. Note that the condition $\beta_1<\sqrt{\beta_2}$ is benign and is typically satisfied in the parameter settings used in practice. Furthermore, such condition is assumed in convergence proof of [4]. This result can be strengthened by providing a similar example of non-convergence even in the easier stochastic optimization setting:

Theorem 3 For any constant $\beta_1, \beta_2 \in [0,1)$ such that $\beta_1<\sqrt{\beta_2}$, there is a stochastic convex optimization problem for which Adam does not converge to the optimal solution.

These results have important consequences insofar that one has to use "problem-dependent" ε, $\beta_1$ and $\beta_2$ in order to avoid bad convergence behavior. In high-dimensional problems, this typically amounts to using, unlike the update in Equation (3), a different ε, $\beta_1$ and $\beta_2$ for each dimension. However, this defeats the purpose of adaptive methods since it requires tuning a large set of parameters. We would also like to emphasize that while the example of non-convergence is carefully constructed to demonstrate the problems in Adam, it is not unrealistic to imagine scenarios where such an issue can at the very least slow down convergence.

While the results stated above use constant $\beta_1$ and $\beta_2$, the analysis of Adam in [4] actually relies on decreasing $\beta_1$ over time. It is quite easy to extend the examples described herein to the case where $\beta_1$ is decreased over time, since the critical parameter is $\beta_2$ rather than $\beta_1$, and as long as $\beta_2$ is bounded away from 1, the analysis goes through. Thus for the sake of clarity, the present disclosure focuses on non-convergence of Adam in the setting where $\beta_1$ is held constant.

4. Example Discussion of New Example Exponential Moving Average Variant: AMSGrad This section provides a new example principled exponential moving average variant ("AMSGrad") and its convergence analysis. One aim is to devise a new strategy with guaranteed convergence while preserving the practical benefits of Adam and RMSprop. To understand the design of the example algorithm, revisit the quantity $\Gamma_t$ in (2). For Adam and RMSprop, this quantity can potentially have negative eigenvalues. The proof in the original paper of Adam erroneously assumes that $\Gamma_t$ is positive semi-definite and is hence, incorrect. For the first part, these algorithms are modified to satisfy this additional constraint. Later on, an alternative approach is explored where $\Gamma_t$ can be made positive semi-definite by using values of $\beta_1$ and $\beta_2$ that change with t.

In some implementations, AMSGrad uses a smaller learning rate in comparison to Adam and yet incorporates the intuition of slowly decaying the effect of past gradients on the learning rate as long as $\Gamma_t$ is positive semi-definite. Algorithm 2 presents the pseudocode for the algorithm. One key difference of AMSGrad with Adam is that it maintains the maximum of all $v_t$ until the present time step and uses this maximum value for normalizing the running average of the gradient instead of $v_t$ in Adam. By doing this, AMSGrad results in a non-increasing step size and avoids the pitfalls of Adam and RMSprop i.e., $\Gamma_t \succeq 0$ for all $t \in [T]$ even with constant $\beta_2$. Also, in Algorithm 2, one typically uses a constant $\beta_{1t}$ in practice.

Algorithm 2: AMSGrad
Input: $x_1 \in \mathcal{F}$, step size $\{\alpha_t\}_{t=1}^T$, $\{\beta_{1t}\}_{t=1}^T$, $\beta_2$
Set $m_0=0$, $v_0=0$ and $\hat{v}_0=0$
for t=1 to T do $g_t = \nabla f_t(x_t)$ $m_t = \beta_{1t} m_{t-1} + (1-\beta_{1t}) g_t$ $v_t = \beta_2 v_{t-1} + (1-\beta_2) g_t^2$ $\hat{v}_t = \max(\hat{v}_{t-1}, v_t)$ and $\hat{V}_t = \text{diag}(\hat{v}_t)$ $$x_{t+1} = \prod_{\mathcal{F}, \sqrt{\hat{V}_t}} (x_t - \alpha_t m_t / \sqrt{\hat{v}_t})$$

end for

To gain more intuition for the updates of AMSGrad, it is instructive to compare its update with Adam and Adagrad. Suppose at particular time step t and coordinate $i \in [d]$, we have $v_{t-1,i} > g_{t,i}^2 > 0$, then Adam aggressively increases the learning rate, however, as seen in the previous section, this can be detrimental to the overall performance of the algorithm. On the other hand, Adagrad slightly decreases the learning rate, which often leads to poor performance in practice since such an accumulation of gradients over a large time period can significantly decrease the learning rate. In contrast, AMSGrad neither increases nor decreases the learning rate and furthermore, decreases $v_t$ which can potentially lead to non-decreasing learning rate even if gradient is large in the future iterations. For rest of the paper, $g_{1:t} = [g_1 \ldots g_t]$ is used to denote the matrix obtained by concatenating the gradient sequence. The following is an important result for AMSGrad.

Theorem 4 Let $\{x_t\}$ and $\{v_t\}$ be the sequences obtained from Algorithm 2, $\alpha_t = \alpha/\sqrt{t}$, $\beta_1 = \beta_{11}$, $\beta_{1t} \leq \beta_1$ for all $t \in [T]$ and $\gamma = \beta_1/\sqrt{\beta_2} < 1$. Assume that $\mathcal{F}$ has bounded diameter $D_\infty$ and $\|\nabla f_t(x)\|_\infty \leq G_\infty$ for all $t \in [T]$ and $x \in \mathcal{F}$. For $x_t$ generated using the AMSGrad (Algorithm 2), we have the following bound on the regret $$R_T \leq \frac{D_\infty^2 \sqrt{T}}{\alpha(1-\beta_1)} \sum_{i=1}^d \hat{v}_{T,i}^{1/2} + \frac{D_\infty^2}{2(1-\beta_1)} \sum_{t=1}^T \sum_{i=1}^d \frac{\beta_{1t} \hat{v}_{t,i}^{1/2}}{\alpha_t} + \frac{\alpha \sqrt{1+\log T}}{(1-\beta_1)^2 (1-\gamma)\sqrt{(1-\beta_2)}} \sum_{i=1}^d \|g_{1:T,i}\|_2.$$

The following result falls as an immediate corollary of the above result.

Corollary 1 Suppose $\beta_{1t} = \beta_1 \lambda^{t-1}$ in Theorem 4, then we have $$R_T \leq \frac{D_\infty^2 \sqrt{T}}{\alpha(1-\beta_1)} \sum_{i=1}^d \hat{v}_{T,i}^{1/2} + \frac{\beta_1 D_\infty^2 G_\infty}{2(1-\beta_1)(1-\lambda)^2} + \frac{\alpha \sqrt{1+\log T}}{(1-\beta_1)^2 (1-\gamma)\sqrt{(1-\beta_2)}} \sum_{i=1}^d \|g_{1:T,i}\|_2.$$

The above bound can be considerably better than $O(\sqrt{dT})$ regret of Sgd when $$\sum_{i=1}^d \hat{v}_{T,i}^{1/2} \ll \sqrt{d} \text{ and } \sum_{i=1}^d \|g_{1:T,i}\|_2 \ll \sqrt{dT}. \quad [3]$$

Furthermore, in Theorem 4, one can use a much more modest momentum decay of $\beta_{1t} = \beta_1/t$ and still ensure a regret of $O(\sqrt{T})$. Note also that one could take a simple average of all the previous values of $v_t$ instead of their maximum. The resulting algorithm is very similar to Adagrad except for normalization with smoothed gradients rather than actual gradients and can be shown to have similar convergence as Adagrad.

5. Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, training data divided into a number of minibatches The model trainer 160 can perform any of the optimization techniques described herein including, as examples, Algorithms 2 and 3 and the methods illustrated in FIGS. 2 and 3.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
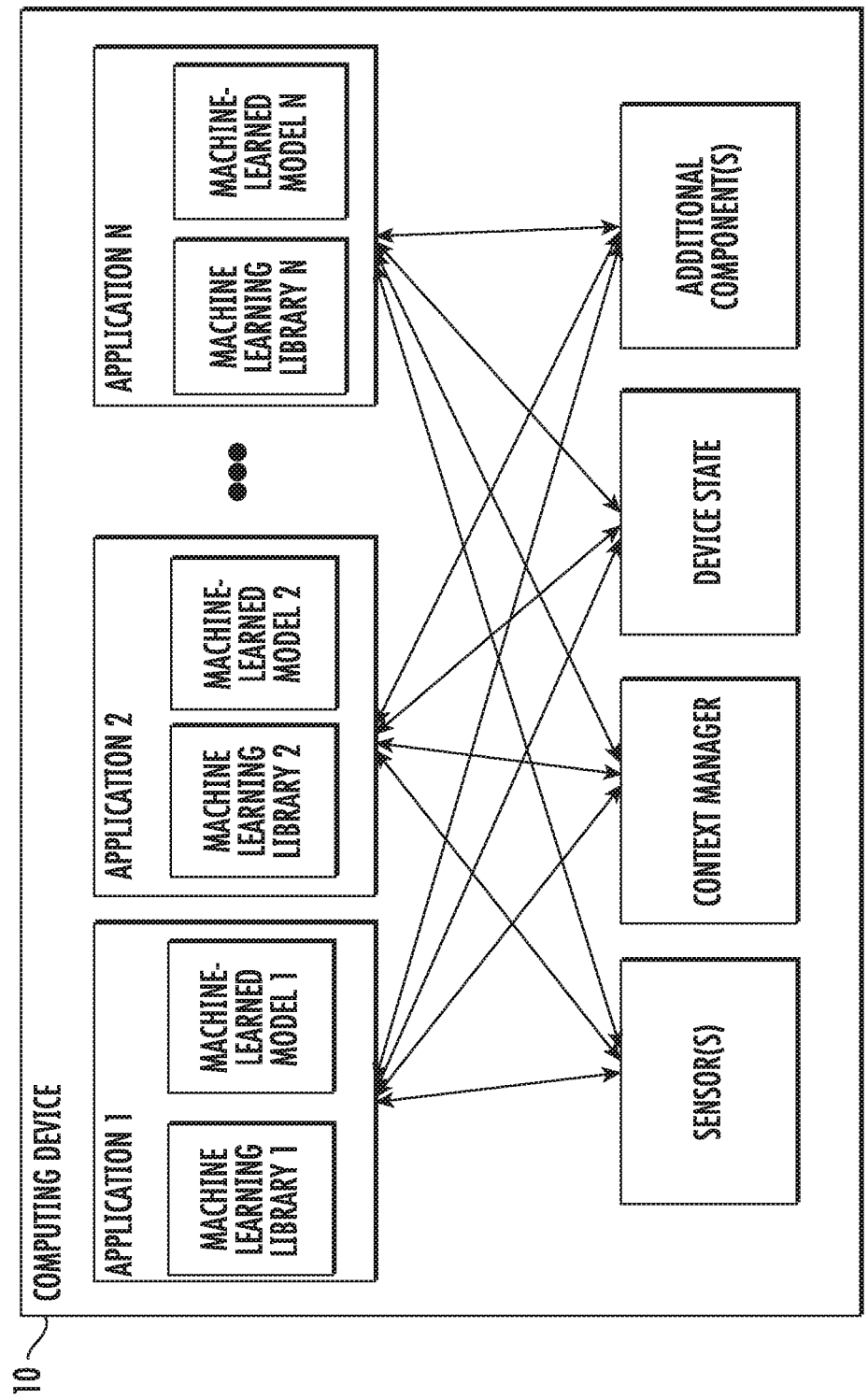
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
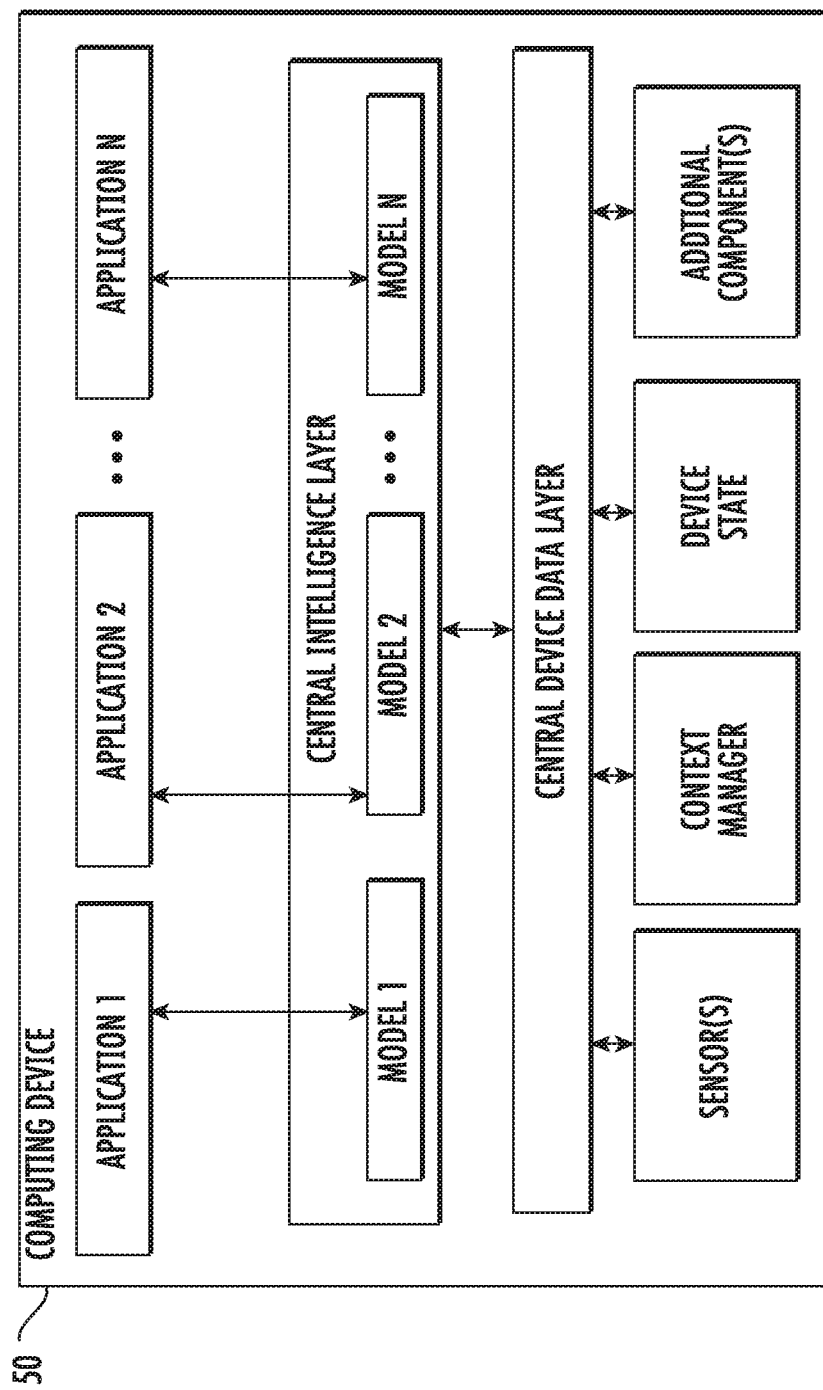
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

6. Example Methods

Figure 2:
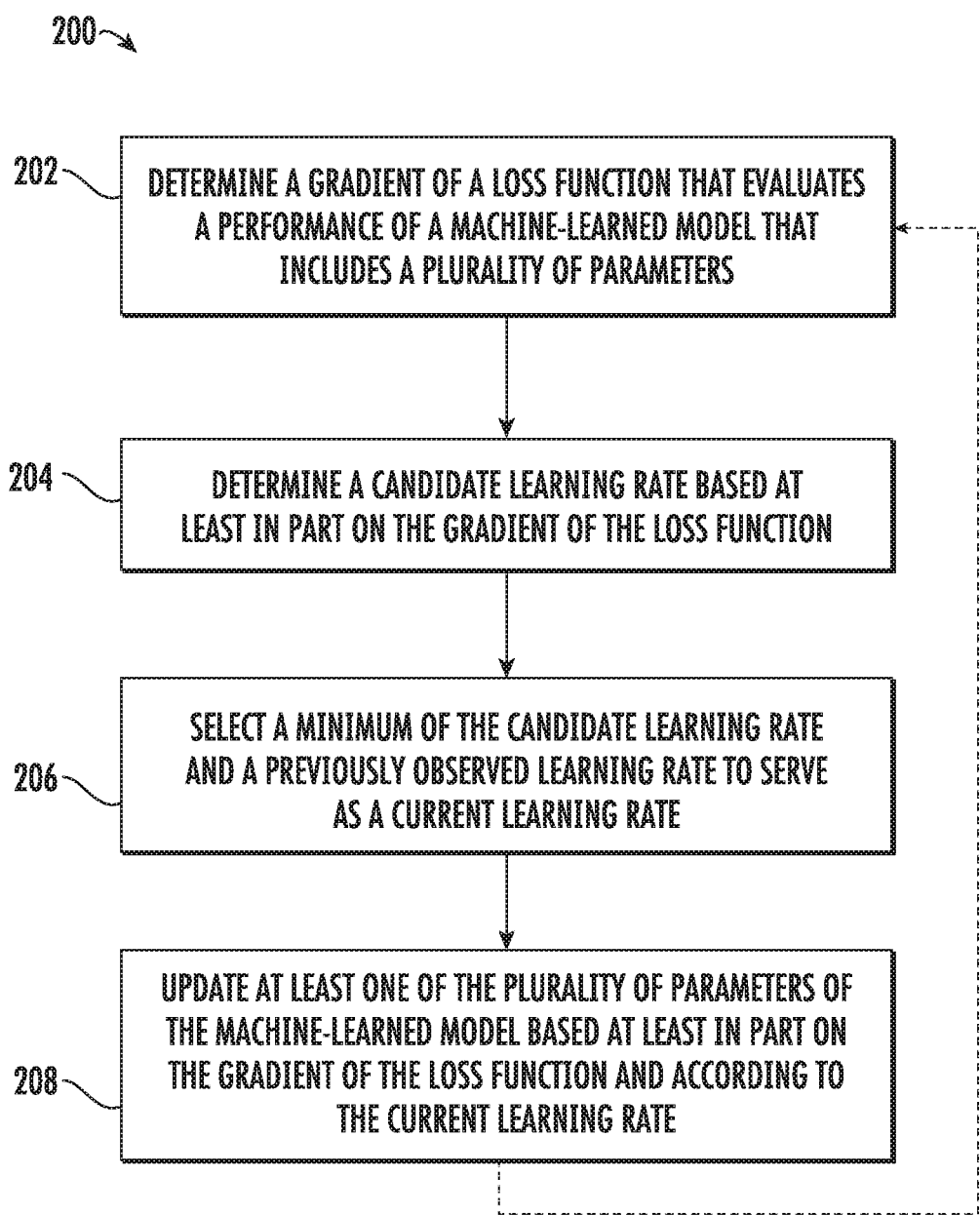
FIG. 2 depicts a flow chart diagram of an example method to train a machine-learned model according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can determine a gradient of a loss function that evaluates a performance of a machine-learned model that includes a plurality of parameters.

At 204, the computing system can determine a candidate learning rate based at least in part on the gradient of the loss function.

At 206, the computing system can select a minimum of the candidate learning rate and a minimum previously observed learning rate to serve as a current learning rate.

Figure 3:
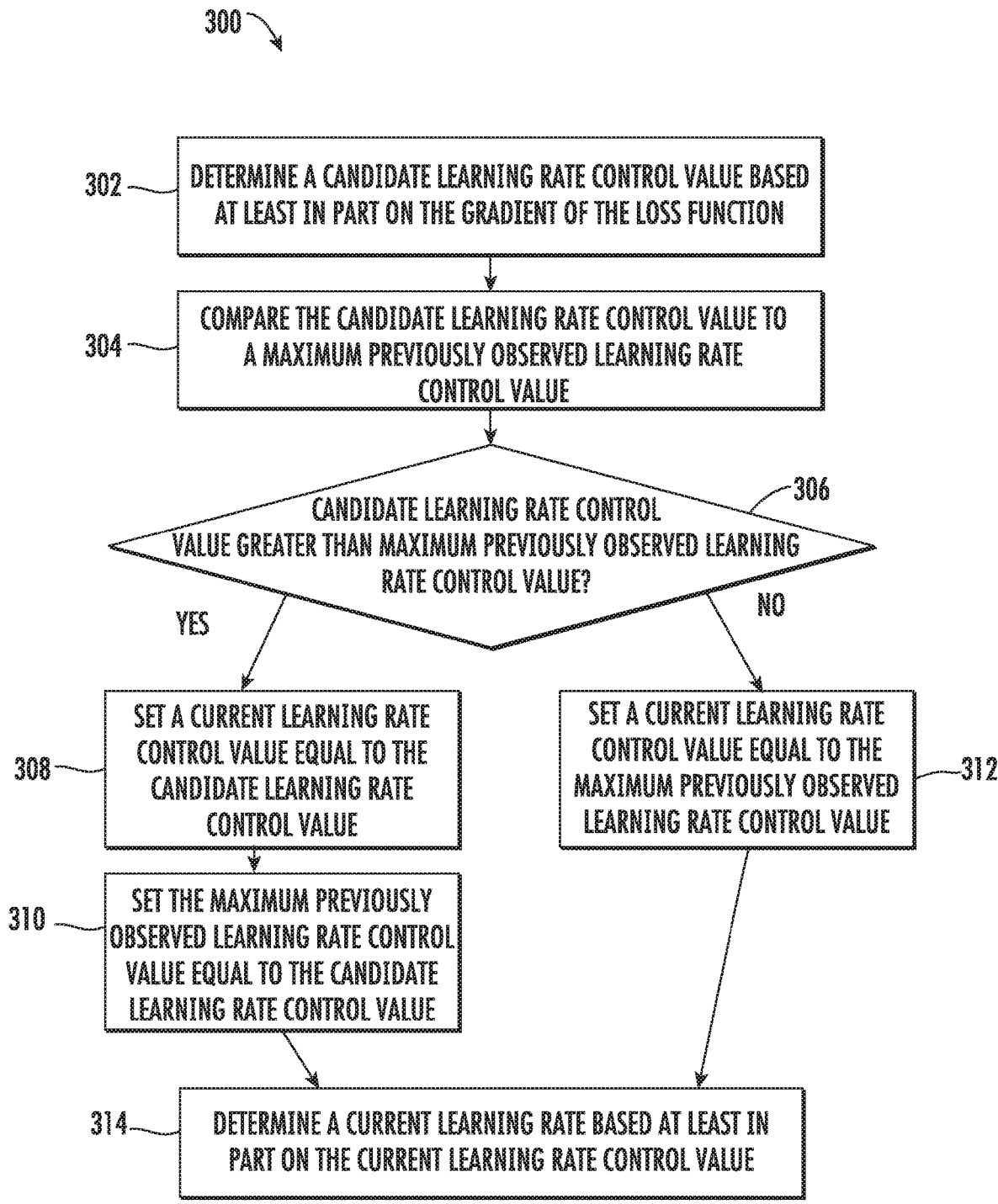
FIG. 3 depicts a flow chart diagram of an example method to determine a current learning rate according to example embodiments of the present disclosure.

FIG. 3 provides one example method 300 for selecting a current learning rate (e.g., one possible technique to perform blocks 204 and 206 of method 200). Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, the computing system can determine a candidate learning rate control value based at least in part on the gradient of the loss function. For example, the candidate learning rate control value can be an exponential moving average of squared past gradients and a square of the gradient of the loss function. For example, the exponential moving average can be controlled based on a second order moment decay factor. In some implementations, the second order moment decay factor can be held constant over a plurality of iterations. In other implementations, the second order moment decay factor can be increased so as to provide increasing influence to past learning rate control values.

At 304, the computing system can compare the candidate learning rate control value to a maximum previously observed learning rate control value.

At 306, the computing system can determine whether the candidate learning rate control value is greater than the maximum previously observed learning rate control value.

If it is determined at 306 that the candidate learning rate control value is greater than the maximum previously observed learning rate control value, then method 300 can proceed to 308.

At 308, the computing system can set a current learning rate control value equal to the candidate learning rate control value.

At 310, the computing system can set the maximum previously observed learning rate control value equal to the candidate learning rate control value.

Referring again to 306, if it is determined at 306 that the candidate learning rate control value not greater than the maximum previously observed learning rate control value, then method 300 can proceed to 312.

At 312, the computing system can set a current learning rate control value equal to the maximum previously observed learning rate control value.

At 314, the computing system can determine a current learning rate based at least in part on the current learning rate control value. As one example, determining the current learning rate based at least in part on the current learning rate control value can include dividing a step size by a square root of a matrix version of the current learning rate control value.

Referring again to FIG. 2, after selecting the current learning rate at 206, next at 208, the computing system can update at least one of the plurality of parameters of the machine-learned model based at least in part on the gradient of the loss function and according to the current learning rate.

As one example, updating the parameters of the model at 208 can include updating a current momentum value based at least in part on the gradient of the loss function and one or more previous momentum values respectively from one or more previous iterations. For example, updating the current momentum value can include determining a moving average of the one or more previous momentum values and the gradient of the loss function.

In some implementations, the updating of the momentum value can be controlled according to or using a momentum decay factor. In some implementations, over a plurality of iterations, the momentum decay factor is held constant while in other implementations, over the plurality of iterations, the momentum decay factor is decreased according to a decay schedule.

In some implementations, updating the parameters of the model at 208 can include determining an updated set of values for the plurality of parameters of the machine-learned model based at least in part on the current momentum value and according to the current learning rate.

In some implementations, updating the parameters of the model at 208 can include performing a projection operation on a current set of values for the plurality of parameters minus the current momentum value times the current learning rate.

After 208, method 200 can optionally return to 202 and again determine a gradient of the loss function evaluated for the machine-learned model with respect to a different batch of training data. Thus, in some implementations, method 200 can be performed iteratively. The iterative look can stop when one or more stopping criteria are met. The stopping criteria can be any number of different criteria including as examples, a loop counter reaching a predefined maximum, iteration over iteration change in parameter adjustments falling below a threshold, the gradient being below a threshold value, and/or various other criteria.

7. Example Experiments

This section provides example empirical results on both synthetic and real-world datasets. For these experiments, the problem of multiclass classification using logistic regression and neural networks is studied, representing convex and nonconvex settings, respectively.

Synthetic Experiments: To demonstrate the convergence issue of Adam, first consider the following simple convex setting inspired from our examples of non-convergence:

$$f_t(x) = \begin{cases} 1010x, & \text{for } t \bmod 101 = 1 \\ -10x, & \text{otherwise}, \end{cases}$$

with the constraint set $\mathcal{F} = [-1, 1]$. First observe that, similar to the examples of non-convergence considered, the optimal solution is $x=-1$; thus, for convergence, it is expected for the algorithms to converge to $x=-1$. For this sequence of functions, the regret and the value of the iterate $x_t$ were investigated for Adam and AMSGrad. To enable fair comparison, $\beta_1=0.9$ and $\beta_2=0.99$ for Adam and AMSGrad algorithm, which are typically the parameters settings used for Adam in practice.

Figure 4A:
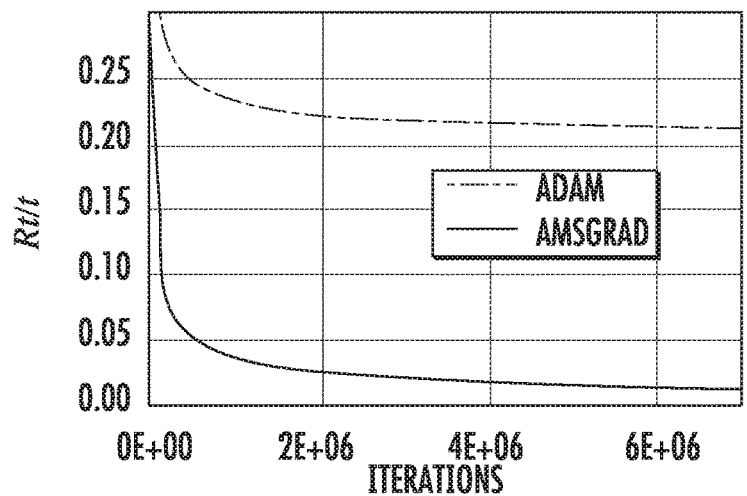
FIGS. 4A-C depict example experimental results according to example embodiments of the present disclosure.
Figure 4B:
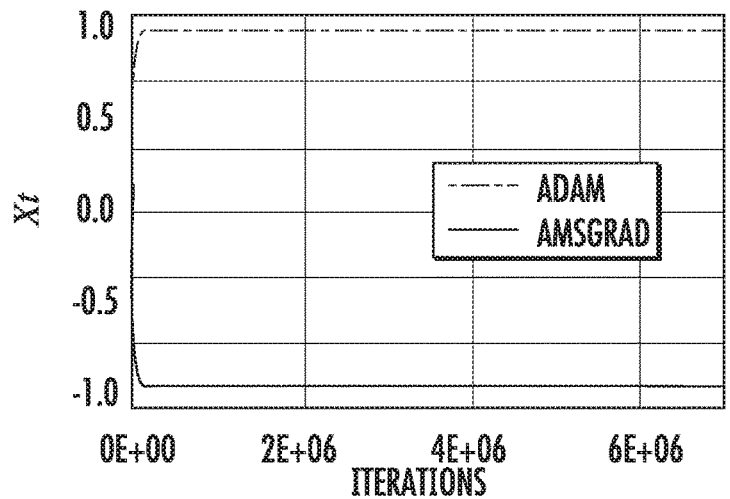
Figure 4C:
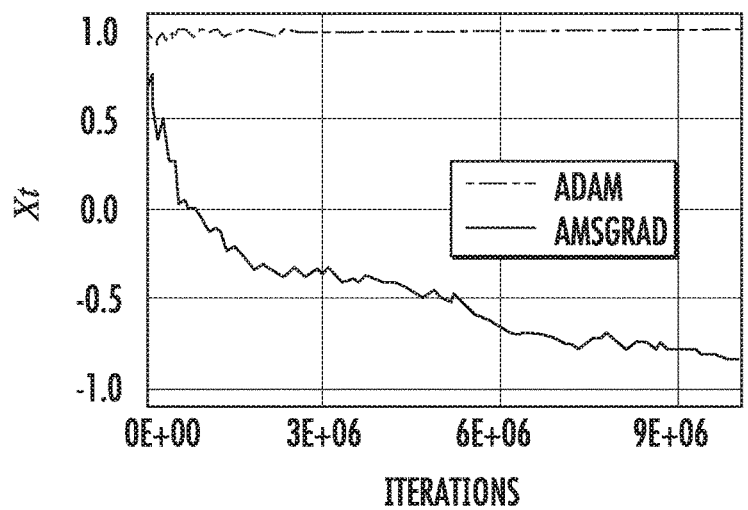

FIGS. 4A-C depict example performance comparisons of Adam and AMSGrad on synthetic examples on a simple one dimensional convex problem inspired by the above used examples of non-convergence. FIGS. 4A and 4B are for the online setting and FIG. 4C is for the stochastic setting.

In particular, FIGS. 4A-C show the average regret ($R_t/t$) and value of the iterate ($x_t$) for this problem. First note that the average regret of Adam does not converge to 0 with increasing t. Furthermore, its iterates $x_t$ converge to $x=1$, which unfortunately has the largest regret amongst all points in the domain. On the other hand, the average regret of AMSGrad converges to 0 and its iterate converges to the optimal solution. FIG. 4C also shows the stochastic optimization setting:

$$f_t(x) = \begin{cases} 1010x, & \text{with probability } 0.01 \\ -10x, & \text{otherwise}. \end{cases}$$

Similar to the aforementioned online setting, the optimal solution for this problem is $x=-1$. Again, we see that the iterate $x_t$ of Adam converges to the highly suboptimal solution $x=1$.

Logistic Regression: To investigate the performance of the algorithm on convex problems, AMSGrad was compared with Adam on a logistic regression problem. The MNIST dataset was used for this experiment; the classification is based on a 784 dimensional image vector to one of the 10 class labels. The step size parameter $\alpha_t$ was set to $\alpha/\sqrt{t}$ for both Adam and AMSGrad in the experiments, consistent with the theory. A minibatch version of these algorithms was used with minibatch size set to 128. Settings included $\beta_1=0.9$ and $\beta_2$ was chosen from the set $\{0.99, 0.999\}$, but they were fixed throughout the experiment. The parameters a and $\beta_2$ were chosen by grid search.

Figure 5A:
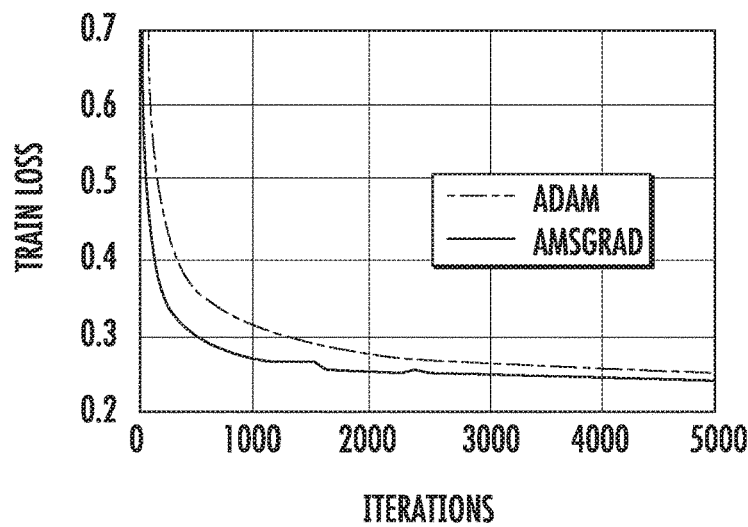
FIGS. 5A-E depict example experimental results according to example embodiments of the present disclosure.
Figure 5B:
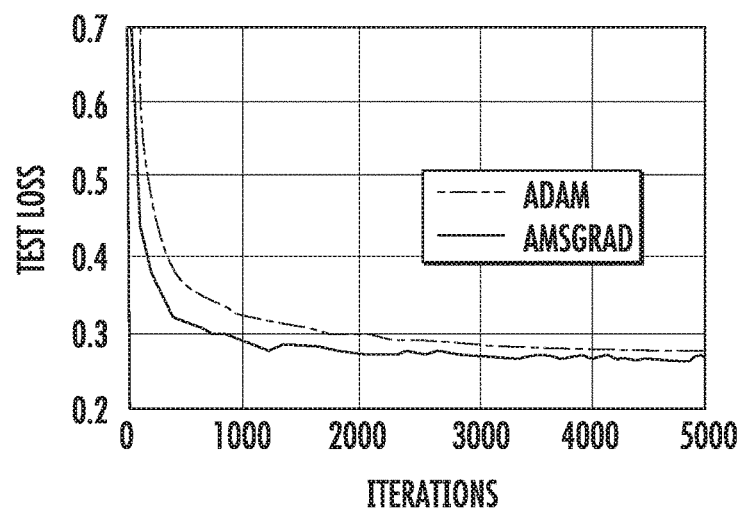

FIGS. 5A-B include the train and test loss with respect to iterations. AMSGrad performed better than Adam with respect to both train and test loss. It was also observed that AMSGrad is relatively more robust to parameter changes in comparison to Adam.

Figure 5C:
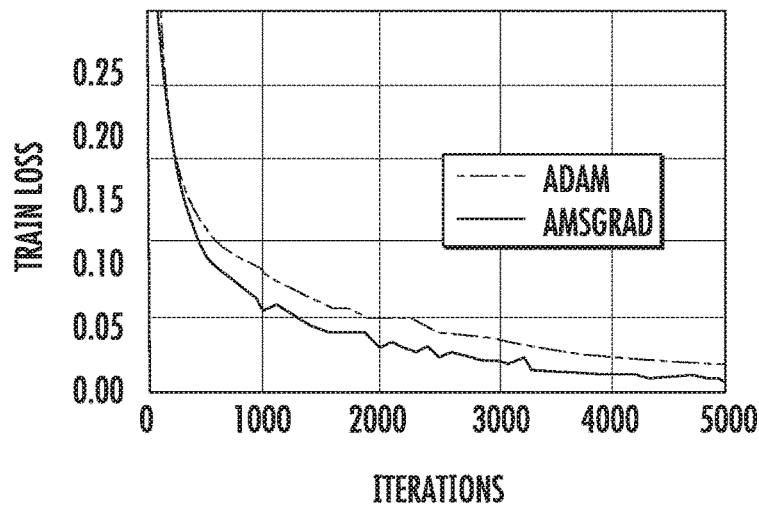

Neural Networks: In another experiment, a simple 1-hidden fully connected layer neural network was trained for the multiclass classification problem on MNIST. Similar to the previous experiment, $\beta_1=0.9$ and $\beta_2$ is chosen from $\{0.99, 0.999\}$. A fully connected 100 rectified linear units (ReLU) was used as the hidden layer for this experiment. Furthermore, constant $\alpha_t=\alpha$ was used throughout all the experiments on neural networks. Such a parameter setting choice of Adam is consistent with the ones typically used in the deep learning community for training neural networks. A grid search was used to determine parameters that provides the best performance for the algorithm. FIG. 5C shows performance of the neural networks.

Figure 5D:
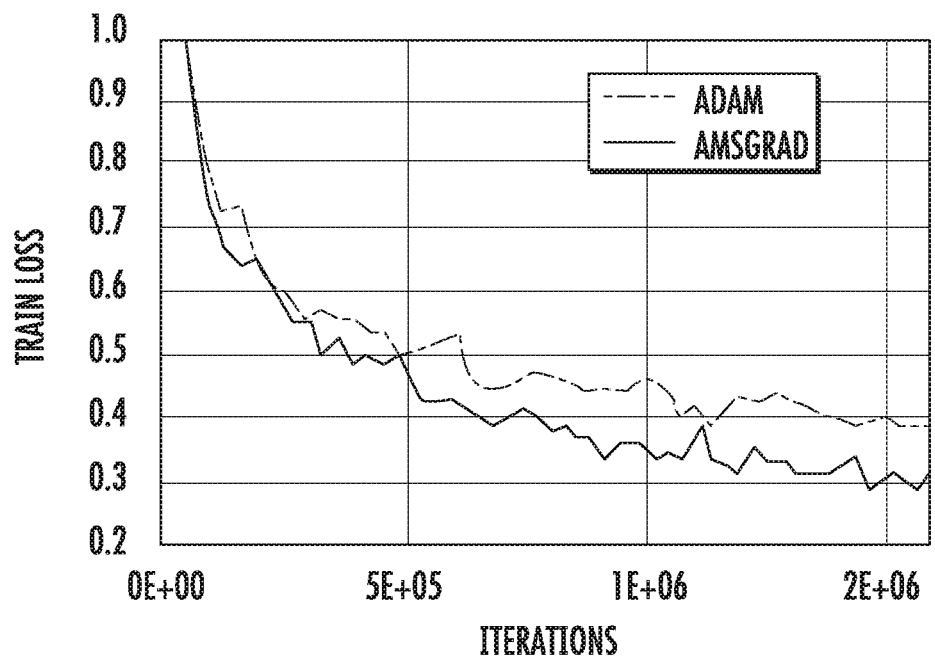
Figure 5E:
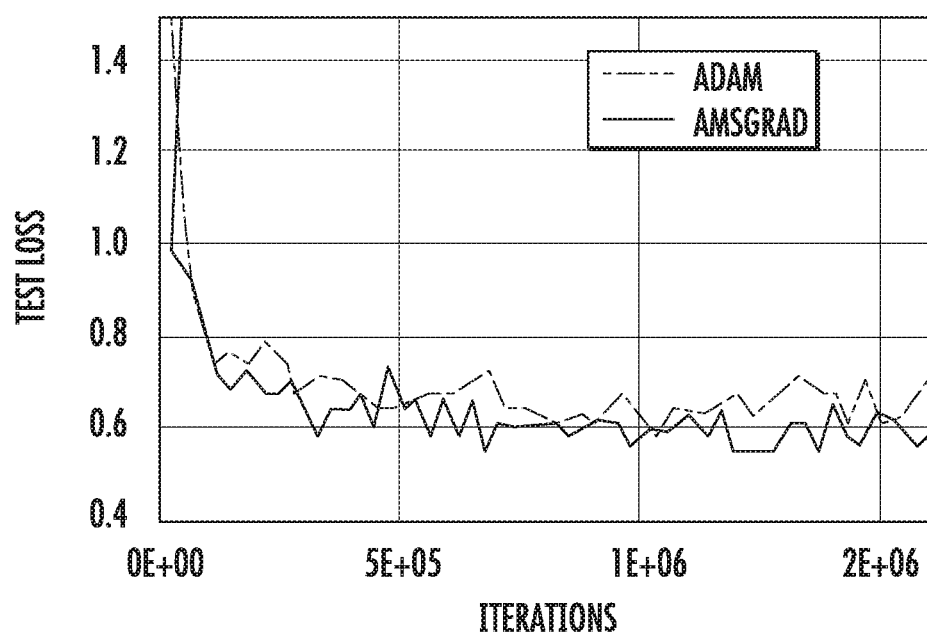

Finally, another experiment considered the multiclass classification problem on the standard CIFAR-10 dataset, which consists of 60,000 labeled examples of 32×32 images. Cifarnet was used, a convolutional neural network (CNN) with several layers of convolution, pooling and non-linear units, for training a multiclass classifier for this problem. In particular, this architecture has 2 convolutional layers with 64 channels and kernel size of 6×6 followed by 2 fully connected layers of size 384 and 192. The network uses 2×2 max pooling and layer response normalization between the convolutional layers [5]. A dropout layer with keep probability of 0.5 is applied in between the fully connected layers [7]. The minibatch size is also set to 128 similar to previous experiments. The results for this problem are reported in FIG. 5D-E. The parameters for Adam and AMSGrad were selected in a way similar to the previous experiments. One can see that AMSGrad performs considerably better than Adam on train loss and accuracy. Furthermore, this performance gain also translates into good performance on test loss.

7.1 Example Extension: AdamNc algorithm

An alternative approach is to use an increasing schedule of $\beta_2$ in Adam. This approach, unlike Algorithm 2 does not require changing the structure of Adam but rather uses a non-constant $\beta_1$ and $\beta_2$. The pseudocode for the algorithm, AdamNc, is provided below as Algorithm 3. By appropriate selection of $\beta_{1t}$ and $\beta_{2t}$, good convergence rates can be achieved.

Algorithm 3: AdamNc
Input: $x_1 \in \mathcal{F}$, step size $\{\alpha_t > 0\}_{t=1}^T$, $\{(\beta_{1t}, \beta_{2t})\}_{t=1}^T$
Set $m_0 = 0$ and $v_0 = 0$
for t=1 to T do $g_t = \nabla f_t(x_t)$ $m_t = \beta_{1t} m_{t-1} + (1-\beta_{1t}) g_t$ $v_t = \beta_{2t} v_{t-1} + (1-\beta_{2t}) g_t^2$ and $V_t = \text{diag}(v_t)$ $x_{t+1} = \prod_{\mathcal{F}, \sqrt{V_t}} (x_t - \alpha_t m_t / \sqrt{v_t})$ end for Theorem 5 Let $\{x_t\}$ and $\{v_t\}$ be the sequences obtained from Algorithm 3, $\alpha_t = \alpha/\sqrt{t}$, $\beta_1 = \beta_{11}$ and $\beta_{1t} \leq \beta_1$ for all $t \in [T]$.

Assume that $\mathcal{F}$ has bounded diameter $D_\infty$ and $\|\nabla f_t(x)\|_\infty \leq G_\infty$ for all $t \in [T]$ and $x \in \mathcal{F}$. Furthermore, let $\{\beta_{2t}\}$ be such that the following conditions are satisfied:

1. $\frac{1}{\alpha_T}\sqrt{\sum_{j=1}^{t}\prod_{k=1}^{t-j}\beta_{2(t-k+1)}(1-\beta_{2j})g_{j,i}^2} \geq \frac{1}{\zeta}\sqrt{\sum_{j=1}^{t}g_{j,i}^2}$ for some $\zeta > 0$ and all $t \in [T]$, $j \in [d]$.

2. $\frac{v_{t,i}^{1/2}}{\alpha_t} \geq \frac{v_{t-1,i}^{1/2}}{\alpha_{t-1}}$ for all $t \in \{2, \ldots, T\}$ and $i \in [d]$.

Then for $x_t$ generated using the AdamNc (Algorithm 3), we have the following bound on the regret $R_T \leq$ $\frac{D_\infty^2}{2\alpha(1-\beta_1)}\sum_{i=1}^{d}\sqrt{T}v_{T,i}^{1/2} + \frac{D_\infty^2}{2(1-\beta_1)}\sum_{t=1}^{T}\sum_{i=1}^{d}\frac{\beta_{1t}v_{t,i}^{1/2}}{\alpha_t} + \frac{2\zeta}{(1-\beta_1)^3}\sum_{i=1}^{d}\|g_{1:T,i}\|_2.$ The above result assumes selection of $\{(\alpha_t, \beta_{2t})\}$ such that $\Gamma_t \succeq 0$ for all $t \in \{2, \ldots, T\}$. However, one can generalize the result to deal with the case where this constraint is violated as long as the violation is not too large or frequent. Following is an immediate consequence of the above result.

Corollary 2 Suppose $\beta_{1t} = \beta_1 \lambda^{t-1}$ and $\beta_{2t} = 1 - 1/t$ in Theorem 5, then we have $\frac{D_\infty^2}{2\alpha(1-\beta_1)}\sum_{i=1}^{d}\|g_{1:T,i}\|_2 + \frac{\beta_1 D_\infty^2 G_\infty}{2(1-\beta_1)(1-\lambda)^2} + \frac{2\zeta}{(1-\beta_1)^3}\sum_{i=1}^{d}\|g_{1:T,i}\|_2.$ The above corollary follows from a trivial fact that $v_{t,i} = \sum_{j=1}^{t}g_{j,i}^2/t$ for all $i \in [d]$ when $\beta_{2t} = 1-1/t$. This corollary is interesting insofar that such a parameter setting effectively yields a momentum based variant of Adagrad. Similar to Adagrad, the regret is data-dependent and can be considerably better than $O(\sqrt{dT})$ regret of Sgd when $\sum_{i=1}^{d}\|g_{1:T,i}\|_2 \ll \sqrt{dT}$ It is easy to generalize this result for setting similar settings of $\beta_{2t}$. Similar to Corollary 1, one can use a more modest decay of $\beta_{1t} = \beta_1/t$ and still ensure a data-dependent regret of $O(\sqrt{T})$.

8. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

9. Bibliography

[1] Cesa-Bianchi, Nicolo and Conconi, Alex and Gentile, Claudio. On the Generalization Ability of On-Line Learning Algorithms. *IEEE Transactions on Information Theory*, 50:2050-2057, 2004.

[2] Timothy Dozat. Incorporating Nesterov Momentum into Adam. *Proceedings of 4th International Conference on Learning Representations, Workshop Track*, 2016.

[3] John C. Duchi and Elad Hazan and Yoram Singer. Adaptive Subgradient Methods for Online Learning and Stochastic Optimization. *Journal of Machine Learning Research*, 12:2121-2159, 2011.

[4] Diederik P. Kingma and Jimmy Ba. Adam: A Method for Stochastic Optimization. *Proceedings of 3rd International Conference on Learning Representations*, 2015.

[5] Alex Krizhevsky and Sutskever, Ilya and Hinton, Geoffrey E. ImageNet Classification with Deep Convolutional Neural Networks. *Advances in Neural Information Processing Systems* 25, pages 1097-1105, 2012.

[6] McMahan, H. Brendan and Streeter, Matthew J. Adaptive Bound Optimization for Online Convex Optimization. *Proceedings of the 23rd Annual Conference On Learning Theory*, pages 244-256, 2010.

[7] Nitish Srivastava and Geoffrey Hinton and Alex Krizhevsky and Ilya Sutskever and Ruslan Salakhutdinov. Dropout: A Simple Way to Prevent Neural Networks from Overfitting. *Journal of Machine Learning Research*, 15:1929-1958, 2014.

[8] Tieleman, T. and Hinton, G. RmsProp: Divide the gradient by a running average of its recent magnitude. COURSERA: Neural Networks for Machine Learning, 2012.

[9] Matthew D. Zeiler. ADADELTA: An Adaptive Learning Rate Method. *CoRR*, abs/1212.5701, 2012.

[10] Martin Zinkevich. Online Convex Programming and Generalized Infinitesimal Gradient Ascent. *Proceedings of the 20th International Conference on Machine Learning*, pages 928-936, 2003.

What is claimed is:

1. A computer-implemented method for iteratively training a model over a plurality of iterations based on a set of training data, wherein the model is parameterized by a set of parameters, and wherein the method comprises:

in a first training iteration of the plurality of iterations:
  determining, by one or more computing devices, a first candidate learning rate control value based on a first current gradient for a loss function for the model, a current subset of the set of training data, and current values for the set of parameters;
  setting, by the one or more computing devices, a first current maximum observed learning rate control value to be equivalent to a greater of two values comprising the first candidate learning rate control value and a first maximum previously observed learning rate control value,
    wherein the first maximum previously observed learning rate control value is a maximum value of all previous candidate learning rate control values determined during all previous iterations of the set of iterations that are previous relative to the first training iteration;
  determining, by the one or more computing devices, a first current learning rate based at least in part on the first current maximum observed learning rate control value; and
  training, by the one or more computing devices, the model via updating the current values for the set of parameters based on the determined first current learning rate, the first current gradient of the loss function for the model, and the current subset of the set of training data; and
in a second training iteration of the plurality of iterations:
  determining, by the one or more computing devices, a second candidate learning rate control value based on a second current gradient for the loss function for the model the current subset of the set of training data, and the current values for the set of parameters;
  setting by the one or more computing devices, a second current maximum observed learning rate control value to be equivalent to a greater of two values comprising the second candidate learning rate control value and a second maximum previously observed learning rate control value,
    wherein the second maximum previously observed learning rate control value is a maximum value of all previous candidate learning rate control values determined during all previous iterations of the set of iterations that are previous relative to the second training iteration;
  determining, by the one or more computing devices a second current learning rate based at least in art on the second current maximum observed learning rate control value; and
  training, by the one or more computing devices the model via updating the current values for the set of parameters based on the determined second current learning rate, the second current gradient of the loss function for the model, and the current subset of the set of training data.

2. The computer-implemented method of claim 1, wherein the method comprises:
  evaluating, by the one or more computing devices, the loss function based on the current subset of the set of training data and the current values for of the set of parameters, wherein evaluating the loss function indicates a current performance of the model; and
  determining, by the one or more computing devices, the first candidate learning rate control value based on evaluating the loss function.

3. The computer-implemented method of claim 2, wherein the method comprises:
  determining, by the one or more computing devices, the first current gradient of the loss function based on evaluating the loss function.

4. The computer-implemented method of claim 3, wherein determining the first candidate learning rate control value comprises:
  determining, by the one or more computing devices, an exponential moving average of squared previous gradients and a square of the first current gradient of the loss function, wherein the previous gradients were determined in at least a portion of the previous iterations of the set of iterations.

5. The computer-implemented method of claim 3, wherein updating the current values for the set of parameters in the first training iteration comprises:
  updating, by the one or more computing devices, a current momentum value based at least in part on the first current gradient of the loss function and one or more previous momentum values that were determined in at least a portion of the previous iterations of the set of iterations; and
  updating, by the one or more computing devices, the current values for the set of parameters the based on at least in part on the current momentum value and the first current learning rate.

6. The computer-implemented method of claim 5, wherein updating the current momentum value comprises:
  determining, by the one or more computing devices, a moving average of the one or more previous momentum values and the first current gradient of the loss function.

7. The computer-implemented method of claim 1, wherein setting the first current maximum observed learning rate control value comprises:
  comparing, by the one or more computing devices, the first candidate learning rate control value to the first maximum previously observed learning rate control value.

8. The computer-implemented method of claim 1, wherein a second order moment decay factor used to determine the first candidate learning rate control value based at least in part on the first current gradient of the loss function is held constant.

9. The computer-implemented method of claim 1, wherein a second order moment decay factor used to determine the first candidate learning rate control value based at least in part on the first current gradient of the loss function is increased so as to provide increasing influence to the previous candidate learning rate control values.

10. The computer-implemented method of claim 1, wherein a momentum decay factor used to update a current momentum value based at least in part on the first current gradient of the loss function is held constant.

11. The computer-implemented method of claim 1, wherein a momentum decay factor used to update a current momentum value based at least in part on the first current gradient of the loss function is decreased according to a decay schedule.

12. A computing system for iteratively training a model over a plurality of iterations based on a set of training data, wherein the model is parameterized by a set of parameters, the system comprising:
  one or more processors; and
  one or more non-transitory computer-readable media that store instructions that, when executed by the one or more processors, cause the one or more processors to perform operations, the operations comprising:

in a first training iteration of the plurality of iterations:

determining a first candidate learning rate control value based on a first current gradient for a loss function for the model, a current subset of the set of training data and current values for the set of parameters;

setting a first current maximum observed learning rate control value to be equivalent to a greater of two values comprising the first candidate learning rate control value and a first maximum previously observed learning rate control value, wherein the first maximum previously observed learning rate control value is a maximum value of all previous candidate learning rate control values determined during all previous iterations of the set of iterations that are previous relative to the first training iteration;

determining a first current learning rate based at least in part on the first current maximum observed learning rate control value; and training the model via updating the current values for the set of parameters based on the determined first current learning rate, the first current gradient of the loss function for the model, and the current subset of the set of training data; and in a second training iteration of the plurality of iterations:

determining a second candidate learning rate control value based on a second current gradient for the loss function for the model, the current subset of the set of training data, and the current values for the set of parameters;

setting a second current maximum observed learning rate control value to be equivalent to a greater of two values comprising the second candidate learning rate control value and a second maximum previously-observed learning rate control value, wherein the second maximum previously observed learning rate control value is a maximum value of all previous candidate learning, rate control values determined during all previous iterations of the set of iterations that are previous relative to the second training iteration;

determining a second current learning rate based at least in art on the second current maximum observed learning rate control value; and training the model via updating the current values for the set of parameters based on the determined second current learning rate, the second current gradient of the loss function for the model, and the current subset of the set of training data.

13. The computing system of claim 12, wherein the operations further comprise:

evaluating the loss function based on the current subset of the set of training data and the current values for the set of parameters, wherein evaluating the loss function indicates a current performance of the model; and determining the first candidate learning rate control value based on evaluating the loss function.

14. The computing system of claim 13, wherein the operations further comprise:

determining the first current gradient of the loss function based on evaluating the loss function.

15. One or more non-transitory computer-readable media that store instructions for iteratively training a model over a plurality of iterations based on a set of training data, wherein the model is parameterized by a set of parameters and when the instructions are executed by one or more processors, cause the one or more processors to perform operations, the operations comprising:

in a first training iteration of a plurality of iterations:

determining a first candidate learning rate control value based on a first current gradient for a loss function for the model, a current subset of the set of training data, and current values for the set of parameters;

setting a first current maximum observed learning rate control value to be equivalent to a greater of two values comprising the first candidate learning rate control value and a first maximum previously observed learning rate control value, wherein the first maximum previously observed learning rate control value is a maximum value of all previous candidate learning rate control values determined during all previous iterations of the set of iterations that are previous relative to the first training iteration;

determining a first current learning rate based at least in part on the first current maximum observed learning rate control value; and training the model via updating the current values for the set of parameters based on the determined first current learning rate, the first current gradient of the loss function for the model and the current subset of the set of training data; and in a second training iteration of the plurality of iterations:

determining a second candidate learning rate control value based on a second current gradient for the loss function for the model, the current subset of the set of training data, and the current values for the set of parameters;

setting a second current maximum observed learning rate control value to be equivalent to a greater of two values comprising the second candidate learning rate control value and a second maximum previously observed learning rate control value, wherein the second maximum previously observed learning rate control value is a maximum value of all previous candidate learning, rate control values determined during all previous iterations of the set of iterations that are previous relative to the second training iteration;

determining a second current learning rate based at least in part on the second current maximum observed learning rate control value; and training the model via updating the current values for the set of parameters based on the determined second current learning rate, the second current gradient of the loss function for the model and the current subset of the set of training data.

16. The computing system of claim 12, wherein updating the current values for the set of parameters in the first training iteration comprises:

updating a current momentum value based at least in part on the first current gradient of the loss function and one or more previous momentum values that were determined in at least a portion of the previous iterations of the set of iterations; and updating the current values for the set of parameters based on at least in part on the current momentum value and the first current learning rate.

17. The computing system of claim 16, wherein updating the current momentum value comprises:
   determining a moving average of the one or more previous momentum values and the first current gradient of the loss function.

18. The computing system of claim 12, wherein setting the first current maximum observed learning rate control value comprises:
   comparing the first candidate learning rate control value to the first maximum previously observed learning rate control value.

19. The computing system of claim 12, wherein a momentum decay factor used to update a current momentum value based at least in part on the first current gradient of the loss function is held constant.

20. The computing system of claim 12, wherein a momentum decay factor used to update a current momentum value based at least in part on the first current gradient of the loss function is decreased according to a decay schedule.

* * * * *